April 27, 1926.
L. W. RICHARDSON
CUTTER
Filed June 21, 1924
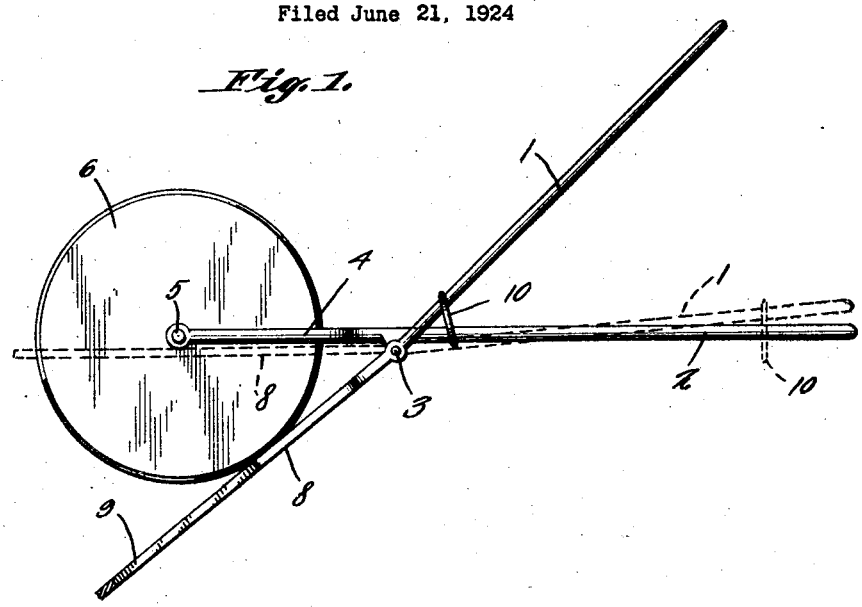
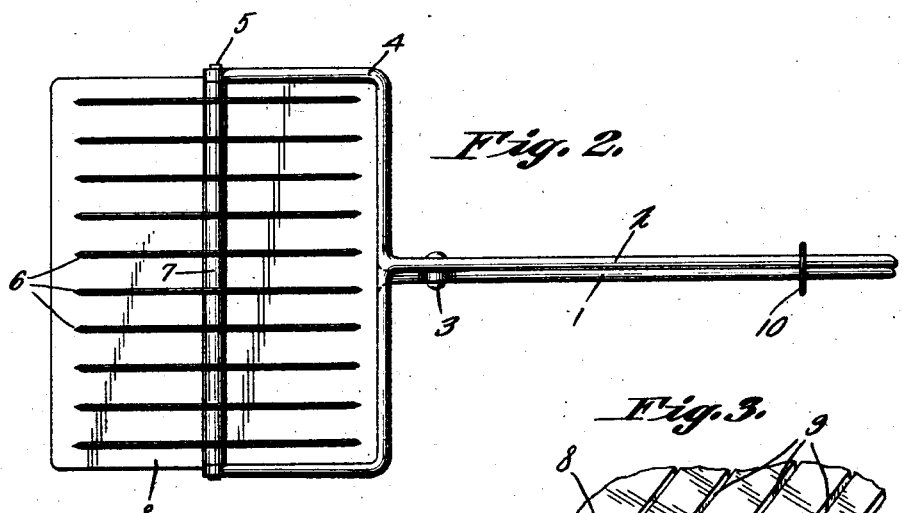
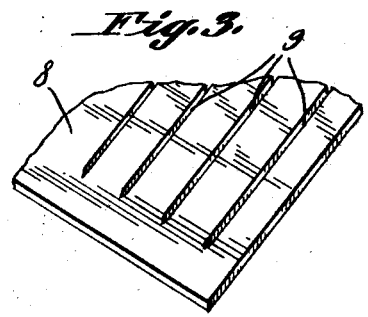
L. W. Richardson, INVENTOR
BY Victor J. Evans, ATTORNEY Patented Apr. 27, 1926.

1,582,787

UNITED STATES PATENT OFFICE.

LAWRENCE W. RICHARDSON, OF SAN FRANCISCO, CALIFORNIA.

CUTTER.

Application filed June 21, 1924. Serial No. 721,555.

*To all whom it may concern:*

Be it known that I, LAWRENCE W. RICHARDSON, a citizen of the United States, residing at San Francisco, in the county of San Francisco and State of California, have invented new and useful Improvements in Cutters, of which the following is a specification.

This invention relates to a cutting device for vegetables and the like, the general object of the invention being to provide a plurality of cutting discs, a handle for carrying the discs, a plate for pressing the articles against the discs and a handle connected with the plate and pivoted to the first handle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the device.

Figure 2 is a plan view with parts in closed position.

Figure 3 is a perspective view of a portion of the slotted plate.

In these views, 1 and 2 indicate a pair of handles which are pivoted together, as shown at 3. One handle is forked, as at 4, and the prongs form bearings for a shaft 5. A plurality of cutting discs 6 are carried by the shaft and are held in spaced relation by the sleeves 7. The other handle carries a plate 8 which is provided with the slots 9 for receiving the discs 6 when the handles are moved towards each other. The handles are held together with the cutting discs passing through the slots in the plate by a looped member 10 which encircles both handles and which is moved towards the outer ends of the handles when the device is to be closed, as shown in dotted lines in Figure 1 and in full lines in Figure 2. When the device is to be used the member 10 is moved to a point adjacent the pivot, as shown in full lines in Figure 1. In use the article to be cut is placed on the slotted plate and then the handles are moved toward each other so that the plate will press the article against the cutting disc which will cut the article into a plurality of parts. During this cutting action the discs will partly turn so as to facilitate the cutting action and bring new portions of the cutting edges into use.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A cutter of the class described including a pair of pivotally connected handle members, one of said handle members being forked at one end to form spaced parallel arms, a shaft journaled in the outer ends of said arms, a plurality of disks mounted on said shaft, sleeves on the shaft between the disks for spacing them a predetermined distance apart, a slotted plate on one end of the other handle on the same side of the pivot as the forked end of the first mentioned handle, said slots being adapted to receive the cutting disks upon movement of the handles toward each other and adjustable means mounted on the ends of the handles opposite the disk and plate whereby to retain said handle in various adjustable positions.

In testimony whereof I affix my signature.

LAWRENCE W. RICHARDSON.